No. 694,804. Patented Mar. 4, 1902.
J. STROMBERG.
MICROMETER GAGE.
(Application filed May 3, 1901.)
(No Model.)
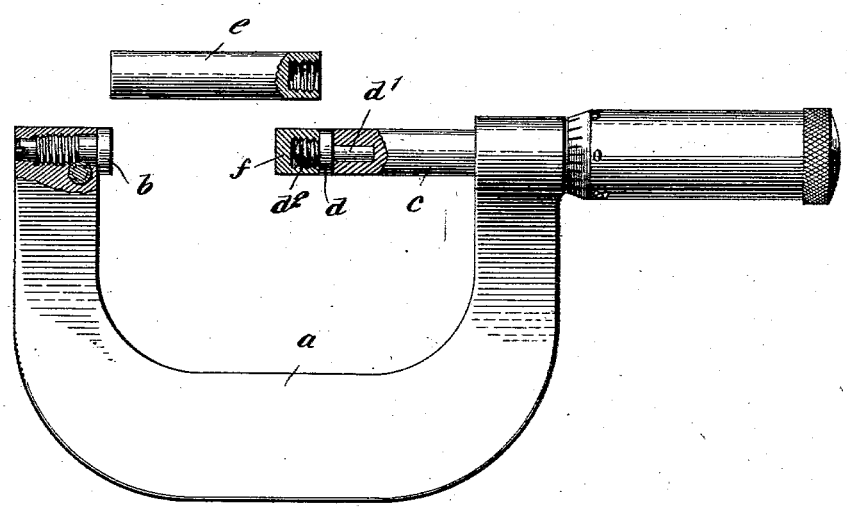
WITNESSES: INVENTOR
Geo. W. Naylor John Stromberg
J. B. Owens BY
Munn
ATTORNEYS
THE NORRIS PETERS CO., PHOTO-LITHO., WASHINGTON, D. C.

UNITED STATES PATENT OFFICE.

JOHN STROMBERG, OF PHŒNIX, ARIZONA TERRITORY.

MICROMETER-GAGE.

SPECIFICATION forming part of Letters Patent No. 694,804, dated March 4, 1902.

Application filed May 3, 1901. Serial No. 58,614. (No model.)

*To all whom it may concern:*

Be it known that I, JOHN STROMBERG, a citizen of the United States, and a resident of Phœnix, in the county of Maricopa and Territory of Arizona, have invented a new and Improved Micrometer-Gage, of which the following is a full, clear, and exact description.

This invention relates to an attachment for micrometer gages and calipers, by which I am enabled with a single instrument to effect micrometer measurements of any length within several inches. Ordinarily these gages have to be constructed of different sizes, each with a range of one inch only; but by means of my invention a single instrument may be constructed accurately to measure any length desired.

This specification is a specific description of one form of the invention, while the claim is a definition of the actual scope thereof.

Reference is to be had to the accompanying drawing, forming a part of this specification, in which the figure represents a side elevation, with parts in section, illustrating the invention.

The usual parts of the micrometer-gage are constructed as before, except that the yoke $a$ is made considerably longer between its arms. On one of the arms is fitted an anvil $b$, and the other arm carries the measuring-screw $c$ and its appurtenant parts. This screw is shortened and is provided with a hardened disk or collar $d$, carrying the stem $d'$, fitted securely within the end of the measuring-screw $c$ and having at the other side a short screw $d^2$. This screw $d^2$ is adapted to carry extension-bars of varying lengths, so that by enlarging the parts the capacity of the gage may be increased or diminished at will. In the drawing I have indicated two extension-bars, which are designated, respectively, $e$ and $f$. The extension-bar $f$ is the shorter and is adapted to increase the capacity of the gage. By removing the extension-bar $f$ and placing in position the bar $e$ the capacity of the gage will be decreased. For the purpose of illustration let it be assumed that when the bar $e$ is in place the gage is capable of measuring only distances within the length of an inch and when the bar $f$ is in place the gage may measure distances between one and two inches. Obviously this could be increased so that the gage could measure within two and three inches, three and four inches, and so on to the extent desired.

In connection with this improvement it should be borne in mind that the measuring-screw $c$ and its appurtenant parts may be arranged precisely the same as in the ordinary inch micrometer-gage, since the screw $c$ need never move more than one inch, each additional inch which the gage may be made to measure by my improvement being covered by the length of the extension-bar fitted thereto. I provide the collar or disk $d$, so that an accurate connection may be effected between the extension-bars and the measuring-screw. The anvil $b$ is also provided with means for adjusting it so as to insure the accuracy of the gage.

Having thus described my invention, I claim as new and desire to secure by Letters Patent—

1. A micrometer-gage, comprising a U-shaped yoke or body portion, an anvil carried by one end of the yoke and having a plane working face, a measuring-screw mounted in the other end of the yoke, a hardened disk fastened securely to the end of the measuring-screw and provided with an outwardly-projected threaded portion, and an extension-bar having at one end a threaded connection with said outwardly-projected threaded portion of the disk, and having its other end adapted to abut against the working face of the anvil.

In testimony whereof I have signed my name to this specification in the presence of two subscribing witnesses.

JOHN STROMBERG.

Witnesses:
J. W. CRENSHAW,
H. B. WILKINSON.